United States Patent Office 3,634,556
Patented Jan. 11, 1972

---

3,634,556
O-(1 - ALKOXYCARBONYL-1-PROPEN-2-YL)-PHOSPHORODIHALIDATES AND -PHOSPHORODIHALOTHIONATES
Jean Pierre Leber and Karl Lutz, Basel, Switzerland, assignors to Sandoz Ltd. (also known as Sandoz AG), Basel, Switzerland
No Drawing. Continuation-in-part of application Ser. No. 838,663, July 2, 1969. This application Nov. 12, 1969, Ser. No. 876,087
Claims priority, application Switzerland, July 15, 1968, 10,551/68; Nov. 16, 1968, 17,054/68
Int. Cl. C07f 9/14; A01n 9/36
U.S. Cl. 260—941                                           25 Claims

ABSTRACT OF THE DISCLOSURE

O - (1 - alkoxycarbonyl-1-propen-2-yl)-phosphorodihalidates and -phosphorodihalothionates useful as intermediates in the production of insecticides/acaricides.

---

This application is a continuation in part of application No. 838,663 filed July 2, 1969, now abandoned.

The present invention relates to new organic phosphorus halides.

According to our invention we provide compounds of Formula I,

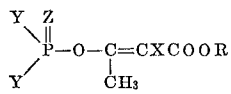

I in which
R signifies an alkyl radical of 1 to 5 carbon atoms,
X signifies a hydrogen, chlorine or bromine atom,
the Y's, which are the same, each signify a chlorine or bromine atom, and
Z signifies an oxygen or a sulphur atom.

According to our invention we also provide a process for the production of a compound of Formula I, which comprises reacting a phosphoric oxy- or thio-chloride or bromide with a compound of Formula II,

CH$_3$CO—CHXCOOR                II in which X and R are as defined above, in the presence of an acid acceptor, or with a salt of a compound of Formula II.

The salt of compound of Formula II is preferably an alkali metal salt.

The reaction may be carried out without solvent or in the presence of a solvent which is inert under the reaction conditions, for example an aromatic hydrocarbon, e.g. toluene or xylene, a halogenated hydrocarbon, e.g. chloroform or trichloroethylene, or an ether, e.g. dioxane. The acid acceptor may be an organic base, for example triethylamine, or an inorganic base, for example sodium bicarbonate. The reaction may be carried out at a temperature of about −10° to +50° C., preferably at −10° C. to room temperature. When a salt of a compound of Formula II is used in place of the compound of Formula II, it is not necessary to use an acid acceptor. It is preferred to use substantially equimolar proportions of the phosphorus halide, of the compound of Formula II or of the salt of the compound of Formula II and, if an acid acceptor is used, of the acid acceptor. The reaction is preferably carried out by stirring the reaction mixture for about half an hour at a temperature between −10° and +50° C., preferably at −10° to +10° C., and then for about 15 minutes at room temperature. The reaction mixture is then washed, optionally after the addition of a solvent when the reaction is effected without solvent, and, after drying, the solvent is removed at a bath temperature of about 20° to 50° C. in a vacuum. The liquid residue may be distilled in a high vacuum to obtain the pure compound of Formula I as an oil.

The preferred compounds of Formula I are those in which X signifies a hydrogen or chlorine atom.

The compounds of Formula I obtained in accordance with the process of the invention predominantly have a cis configuration in the crotonic acid radical (i.e. the —CH$_3$ group is cis to the —COOR group) when an organic base, e.g. triethylamine, is used as acid acceptor. When, for example, sodium bicarbonate is used as acid acceptor, the portion of cis configuration in the crotonic acid radical of the compound of Formula I is smaller than when triethylamine is used. When, for example, a sodium acetoacetic acid ester is used in place of the acetoacetic ester of Formula II and an acid acceptor, then compounds of Formula I predominantly having the trans form in the crotonic acid radical are obtained. The stereoisomeric composition of the compounds of Formula I may be determined in conventional manner by the nuclear magnetic resonance spectrum.

The compounds of Formula I obtained in accordance with the process of the invention are useful as intermediates for the production of biocides, e.g. insecticides and acaricides. For example, the compounds of Formula I react with a corresponding amount of an alkanol, in the presence of an acid acceptor to yield compounds on which both the halogen atoms Y on the phosphorus atom have been exchanged for alkoxy radicals. The halogen atoms Y on the phosphorus atom may also be exchanged for two different alkoxy radicals in two separate stages. In the first stage about 1 mol of an alkanol is reacted with a compound of Formula I in the presence of, a preferably equimolar amount of, an acid acceptor and the resulting compound is then reacted in the second stage with about 1 mol of a different alkanol, again in the presence of, a preferably equivalent amount of, an acid acceptor.

By the processes described immediately above, it is possible to obtain biocides, e.g. insecticides and acaricides, some of which biocides are known and may be used in known manner. Those of the biocides which are not specifically known can be used in the same manner as the known biocides.

The invention is illustrated, but in no way limited by the following examples in which the temperatures are in degrees centigrade.

EXAMPLE 1

O-(1-ethoxycarbonyl-1-propen-2-yl) phosphordichloridate 130 g. (1 mol) of acetoacetic acid ethyl ester and 101 g. (1 mol) of triethylamine are added over a period of half an hour to 154 g. (1 mol) of phosphorus oxychloride in 500 cc. of toluene with stirring and at a temperature of −10°, whereby triethylamine hydrochloride precipitates. The reaction mixture is subsequently stirred for a further half hour at a temperature between −10° and +10° and then for 15 minutes at 20°. The resulting precipitate is subsequently filtered off and the solvent in the filtrate is removed at a bath temperature of 50° in a water jet vacuum to yield crude O-(1-ethoxycarbonyl-1-propen-2-yl) phosphorodichloridate. The pure compound has a B.P. of 77–78°/0.15 mm. of Hg and has a refractive index of $n_D^{20}$=1.4700.

*Analysis.*—C$_6$H$_9$Cl$_2$O$_4$P; molecular weight: 247.01 Calc. (percent): C, 29.2; H, 3.7; Cl, 28.7. Found (percent): C, 29.8; H, 3.7; Cl, 29.4.

EXAMPLE 2

O-(1-ethoxycarbonyl-1-propen-2-yl) phosphorodichloridate 11.5 g. of sodium metal are pulverized in 1.2 liters of toluene at about 110° with a vibro mixer. 65 g. of acetoacetic acid ethyl ester are then added dropwise to the sodium suspension at 20–40°. After the reaction is completed the viscous suspension of sodium acetoacetic acid ethyl ester is added dropwise to a solution of 77 g. of phosphorus oxychloride in 100 cc. of toluene at 10–20°. The reaction mixture is subsequently stirred at room temperature for half an hour and the toluene is then distilled off in a vacuum. The residue is taken up in ether, the precipitated sodium chloride is filtered off and the filtrate concentrated by evaporation. The resulting pure compound has a B.P. of 48–50°/$10^{-3}$ mm. of Hg. It consists almost exclusively of O-(1-ethoxycarbonyl-1-propen-2-yl) phosphorodichloridate having the trans form in the crotonic acid radical.

EXAMPLE 3

O-(1-methoxycarbonyl-1-propen-2-yl) thiophosphorodichloridate 50.5 g. (0.5 mol) of triethylamine are added with stirring over a period of 30 minutes and at a temperature of 10° to a mixture of 84.5 g. (0.5 mol) of phosphorus thiochloride and 58 g. (0.5 mol) of acetoacetic acid methyl ester, whereby triethylamine hydrochloride precipitates. The reaction mixture is subsequently stirred for a further half hour at a temperature between —10° and +10°, and then for 15 minutes at 20°. 250 cc. of chloroform are then added to the reaction mixture, the mixture is washed, dried and the solvent removed in a water jet vacuum at a bath temperature of 50°. Crude O-(1-methoxycarbonyl-1-propen-2-yl) thiophosphorodichloridate is obtained. The pure compound has a B.P. of 42°/$5.10^{-3}$ mm. of Hg. The relationship cis:trans isomer in the crotonic acid radical is about 9:1.

Analysis.—$C_5H_7Cl_2O_3PS$; molecular weight: 249. Calc. (percent): C, 24.1; Cl, 28.4; P, 12.4; S, 12.8. Found (percent): C, 24.4; Cl, 28.4; P, 12.1; S, 12.8.

EXAMPLE 4

O-(1-methoxycarbonyl-1-propen-2-yl) thiophosphorodichloridate 4.6 g. of sodium metal are pulverized in 0.3 liter of toluene at about 110° with a vibro mixer. 24 g. of acetoacetic acid methyl ester are added dropwise to the sodium suspension at 20–40°. After the reaction is completed the viscous suspension of sodium acetoacetic acid methyl ester is added dropwise to a solution of 34 g. of phosphorus thiochloride in 100 cc. of toluene while stirring at 10–20°. The reaction mixture is subsequently stirred at room temperature for 30 minutes, is washed with ice water and after drying with sodium sulphate the toluene is distilled off in a vacuum. The residue is distilled yielding O-(1-methoxycarbonyl-1-propen-2-yl) thiophosphorodichloridate having a B.P. of 40°/$10^{-3}$ mm. of Hg. The compound exclusively consists of the trans form in the crotonic acid radical.

EXAMPLE 5

O-(1-chloro-1-methoxycarbonyl-1-propen-2-yl) phosphorodichloridothionate 30.5 g. (0.3 mol) of triethylamine are added at 10° with stirring and over a period of 1 hour to a mixture of 51 g. (0.3 mol) of phosphorus thiochloride and 45 g. (0.3 mol) of α-chloro-acetoacetic acid methyl ester in 100 cc. of toluene. Stirring is subsequently continued at room temperature for about half an hour. The reaction mixture is then washed twice with ice water, the toluene layer is separated, dried with sodium sulphate and the toluene is distilled off. Crude O-(1-chloro-1-methoxycarbonyl-1-propen-3-yl) phosphorodichloridothionate is obtained. The pure compound has a B.P. of 45–48°/$5.10^{-3}$ mm. of Hg. The relationship cis:trans isomer in the crotonic acid radical is 9:1.

Analysis.—$C_5H_6Cl_3O_3PS$; molecular weight: 283.5. Calc. (percent): C, 21.2; Cl, 37.5; P, 10.9; S, 11.3. Found (percent): C, 21.2; Cl, 36.8; P, 11.1; S, 11.0.

The following compounds of Formula I are obtained in a manner analogous to that described in Examples 1, 3 and 5.

| Example | R | X | Y | Z | Empirical formula | Molecular weight | B.P./mm. of Hg, ° C. | Relationship cis:trans in the crotonic acid radical | Found C | Found Cl | Found P | Found S | Calculated C | Calculated Cl | Calculated P | Calculated S |
|---|---|---|---|---|---|---|---|---|---|---|---|---|---|---|---|---|
| 6 | $CH_3$ | H | Cl | O | $C_5H_7Cl_2O_4P$ | 232.99 | 65°/0.01 | 9:1 | 26.3 | 30.8 | 13.4 | | 25.8 | 30.4 | 13.3 | |
| 7 | $iC_3H_7$ | H | Cl | O | $C_7H_{11}Cl_2O_4P$ | 261.04 | 72°/0.02 | 9:1 | 32.4 | 26.5 | 11.9 | | 32.2 | 27.2 | 11.9 | |
| 8 | $tC_4H_9$ | H | Cl | O | $C_8H_{13}Cl_2O_4P$ | 275.07 | 43–5°/$5.10^{-5}$ | 85:15 | 34.1 | 24.9 | 11.2 | | 34.9 | 25.8 | 11.3 | |
| 9 | $tC_5H_{11}$ | H | Cl | O | $C_9H_{15}Cl_2O_4P$ | 289.09 | 48°/$5.10^{-5}$ | 85:15 | 36.8 | 23.9 | 10.8 | | 37.4 | 24.5 | 10.7 | |
| 10 | $C_2H_5$ | Cl | Cl | O | $C_6H_9Cl_3O_4P$ | 281.46 | 83°/0.01 | 9:1 | 26.4 | 36.9 | 10.9 | | 25.6 | 37.8 | 11.0 | |
| 11 | $nC_3H_7$ | Cl | Cl | O | $C_7H_{10}Cl_3O_4P$ | 295.49 | 88–9°/0.01 | 9:1 | 28.9 | 35.8 | 10.4 | | 28.5 | 36.0 | 10.5 | |
| 12 | $C_2H_5$ | H | Cl | S | $C_6H_9Cl_2O_3PS$ | 263.00 | 40°/$1.10^{-3}$ | 9:1 | 27.7 | 26.8 | 11.9 | 12.5 | 27.3 | 27.0 | 11.8 | 12.2 |
| 13 | $nC_3H_7$ | H | Cl | S | $C_7H_{11}Cl_2O_3PS$ | 277 | 45°/$1.10^{-3}$ | 95:5 | 30.8 | 24.8 | 10.9 | 11.7 | 30.2 | 25.6 | 11.2 | 11.6 |
| 14 | $iC_3H_7$ | H | Cl | S | $C_7H_{11}Cl_2O_3PS$ | 277 | 43°/$1.10^{-3}$ | 95:5 | 30.7 | 25.1 | 10.8 | 11.7 | 30.2 | 25.6 | 11.2 | 11.6 |
| 15 | $nC_4H_9$ | H | Cl | S | $C_8H_{13}Cl_2O_3PS$ | 291 | 53°/$1.10^{-3}$ | 85:15 | 33.4 | 24.1 | 10.3 | 10.8 | 33.0 | 24.4 | 10.7 | 11.0 |
| 16 | $iC_4H_9$ | H | Cl | S | $C_8H_{13}Cl_2O_3PS$ | 291 | 54°/$1.10^{-3}$ | 9:1 | 33.5 | 23.8 | 10.1 | 10.9 | 33.0 | 24.4 | 10.7 | 11.0 |
| 17 | $Sec-C_4H_9$ | H | Cl | S | $C_8H_{13}Cl_2O_3PS$ | 291 | 52°/$1.10^{-3}$ | 9:1 | 33.3 | 24.0 | 9.8 | 10.8 | 33.0 | 24.4 | 10.7 | 11.0 |
| 18 | $tC_4H_9$ | H | Cl | S | $C_8H_{13}Cl_2O_3PS$ | 291 | 40–45°/mol. dist. (finger temp.) | 95:5 | 33.1 | 23.7 | 10.1 | 11.0 | 33.0 | 24.4 | 10.7 | 11.0 |
| 19 | $iC_5H_{11}$ | H | Cl | S | $C_9H_{15}Cl_2O_3PS$ | 305 | 68–70°/$1.10^{-3}$ | 85:15 | 36.3 | 23.2 | 9.9 | 10.9 | 35.4 | 23.3 | 10.2 | 10.5 |
| 20 | $tC_5H_{11}$ | H | Cl | S | $C_9H_{15}Cl_2O_3PS$ | 305 | 45–50°/mol. dist. (finger temp.) | 9:1 | 35.8 | 24.0 | 9.9 | 10.8 | 35.4 | 23.3 | 10.2 | 10.5 |
| 21 | $C_2H_5$ | Cl | Cl | S | $C_6H_8Cl_3O_3PS$ | 297.5 | 55–58°/$10^{-2}$ | 9:1 | 24.8 | 35.3 | 10.5 | 10.2 | 24.2 | 35.8 | 10.8 | 10.4 |
| 22 | $nC_3H_7$ | Cl | Cl | S | $C_7H_{10}Cl_3O_3PS$ | 311.5 | 60–62°/$5.10^{-2}$ | 9:1 | 27.7 | 33.8 | 10.3 | 9.8 | 27.0 | 34.2 | 10.3 | 9.3 |
| 23 | $iC_3H_7$ | Cl | Cl | S | $C_7H_{10}Cl_3O_3PS$ | 311.5 | 52°/$10^{-3}$ | 85:15 | 27.5 | 33.8 | 9.9 | 9.7 | 27.0 | 34.2 | 10.3 | 9.3 |
| 24 | $nC_4H_9$ | Cl | Cl | S | $C_8H_{12}Cl_3O_3PS$ | 325.5 | 62–64°/$10^{-3}$ | 9:1 | 30.1 | 32.2 | 9.2 | 8.9 | 29.5 | 32.7 | 9.8 | 9.5 |
| 25 | $nC_5H_{11}$ | Cl | Cl | S | $C_9H_{14}Cl_3O_3PS$ | 339.5 | 73–75°/$10^{-3}$ | 9:1 | 32.8 | 30.7 | 8.6 | 8.9 | 31.9 | 31.4 | 9.1 | 9.4 |

What is claimed is:

1. Compounds of formula:

in which R signifies alkyl of 1 to 5 carbon atoms, X signifies hydrogen, chlorine or bromine, the Y's, which are the same, each signify chlorine or bromine, and Z signifies oxygen or sulphur.

2. A compound as claimed in claim 1, wherein R signifies ethyl, X signifies hydrogen, Y signifies chlorine and Z signifies oxygen.

3. A compound as claimed in claim 1, wherein R signifies methyl, X signifies hydrogen, Y signifies chlorine and Z signifies sulphur.

4. A compound as claimed in claim 1, wherein R signifies methyl, X signifies chlorine, Y signifies chlorine and Z signifies oxygen.

5. A compound as claimed in claim 1, wherein R signifies methyl, X signifies hydrogen, Y signifies chlorine and Z signifies oxygen.

6. A compound as claimed in claim 1, wherein R signifies isopropyl, X signifies hydrogen, Y signifies chlorine and Z signifies oxygen.

7. A compound as claimed in claim 1, wherein R signifies tert. butyl, X signifies hydrogen, Y signifies chlorine and Z signifies oxygen.

8. A compound as claimed in claim 1, wherein R signifies tert. pentyl, X signifies hydrogen, Y signifies chlorine and Z signifies oxygen.

9. A compound as claimed in claim 1, wherein R signifies ethyl, X signifies chlorine, Y signifies chlorine and Z signifies oxygen.

10. A compound as claimed in claim 1, wherein R signifies n-propyl, X signifies chlorine, Y signifies chlorine and Z signifies oxygen.

11. A compound as claimed in claim 1, wherein R signifies ethyl, X signifies hydrogen, Y signifies chlorine and Z signifies sulphur.

12. A compound as claimed in claim 1, wherein R signifies n-propyl, X signifies hydrogen, Y signifies chlorine and Z signifies sulphur.

13. A compound as claimed in claim 1, wherein R signifies isopropyl, X signifies hydrogen, Y signifies chlorine and Z signifies sulphur.

14. A compound as claimed in claim 1, wherein R signifies n-butyl, X signifies hydrogen, Y signifies chlorine and Z signifies sulphur.

15. A compound as claimed in claim 1, wherein R signifies isobutyl, X signifies hydrogen, Y signifies chlorine and Z signifies sulphur.

16. A compound as claimed in claim 1, wherein R signifies sec-butyl, X signifies hydrogen, Y signifies chlorine and Z signifies sulphur.

17. A compound as claimed in claim 1, wherein R signifies tert. butyl, X signifies hydrogen, Y signifies chlorine and Z signifies sulphur.

18. A compound as claimed in claim 1, wherein R signifies isopentyl, X signifies hydrogen, Y signifies chlorine and Z signifies sulphur.

19. A compound as claimed in claim 1, wherein R signifies tert. pentyl, X signifies hydrogen, Y signifies chlorine and Z signifies sulphur.

20. A compound as claimed in claim 1, wherein R signifies ethyl, X signifies chlorine, Y signifies chlorine and Z signifies sulphur.

21. A compound as claimed in claim 1, wherein R signifies n-propyl, X signifies chlorine, Y signifies chlorine and Z signifies sulphur.

22. A compound as claimed in claim 1, wherein R signifies isopropyl, X signifies chlorine, Y signifies chlorine and Z signifies sulphur.

23. A compound as claimed in claim 1, wherein R signifies n-butyl, X signifies chlorine, Y signifies chlorine and Z signifies sulphur.

24. A compound as claimed in claim 1, wherein R signifies n-pentyl, X signifies chlorine, Y signifies chlorine and Z signifies sulphur.

25. A compound as claimed in claim 1, wherein the —$CH_3$ is cis to the —COOR in the crotonic acid radical.

No references cited.

CHARLES B. PARKER, Primary Examiner

A. M. SUTTO, Assistant Examiner

U.S. Cl. X.R.

260—972, 973; 424—212